(12) United States Patent
Cannon et al.

(10) Patent No.: US 11,249,743 B2
(45) Date of Patent: Feb. 15, 2022

(54) DATA ANALYTICS TO DETERMINE SOFTWARE MAINTENANCE ADVISORY USING INPUT DATA

(71) Applicant: International Business Machines Corporation, Armonk, NY (US)

(72) Inventors: Gray Cannon, Miami, FL (US); Marco Aurelio Stelmar Netto, Sao Paulo (BR); Ashraf Ali Thajudeen, Vriddhachalam (IN); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/685,386

(22) Filed: Nov. 15, 2019

(65) Prior Publication Data

US 2021/0149658 A1    May 20, 2021

(51) Int. Cl.
*G06F 9/44* (2018.01)
*G06F 8/65* (2018.01)
*G06N 3/08* (2006.01)
*G06N 3/04* (2006.01)
*G06F 16/9536* (2019.01)

(52) U.S. Cl.
CPC ............ *G06F 8/65* (2013.01); *G06F 16/9536* (2019.01); *G06N 3/04* (2013.01); *G06N 3/08* (2013.01)

(58) Field of Classification Search
CPC ...... G06F 8/65; G06F 16/9536; G06F 16/953; G06F 16/9535; G06N 3/04; G06N 3/08
USPC ........................................................ 717/168
See application file for complete search history.

(56) References Cited

U.S. PATENT DOCUMENTS

| 6,151,565 A * | 11/2000 | Lobley ................... G06Q 10/06 703/2 |
| 6,317,700 B1 * | 11/2001 | Bagne ..................... G06N 5/025 702/181 |
| 7,359,865 B1 * | 4/2008 | Connor .................. G06Q 40/08 705/7.28 |
| 9,053,440 B2 * | 6/2015 | Chmiel ............. G06F 16/24578 |

(Continued)

OTHER PUBLICATIONS

Most eGovernment-for-development projects fail: how can risks be reduced? author: Heeks Published on—2003.*

(Continued)

*Primary Examiner* — Chameli Das
(74) *Attorney, Agent, or Firm* — Michael A. Petrocelli

(57) ABSTRACT

Advising on computer software upgrade decisions for enterprise software by analyzing respective vendor information correlated to influences from user data including periodically checking for vendor software updates for selected software programs. A plurality of factors are assessed for software update risks, and the factors include dimensions of importance of each of the factors. Opinion and comments from users on public websites are collected regarding the software and the software updates. Each of the dimensions for each of one or more factors for a selected software program are weighted. The weighting is based on an importance for each of the dimensions for a respective user. A risk score is calculated based on the assessed software update risk for each dimension which includes the weighting of each of the dimensions, and a notification is sent to a user recommending the software upgrade or not based on the risk score.

14 Claims, 11 Drawing Sheets

(56) References Cited

U.S. PATENT DOCUMENTS

| | | | | |
|---|---|---|---|---|
| 9,411,954 | B2* | 8/2016 | Bell, Jr. | G06F 21/126 |
| 9,483,247 | B2 | 11/2016 | Mandava | |
| 9,558,464 | B2 | 1/2017 | Bassin | |
| 10,095,509 | B2 | 10/2018 | Xia | |
| 10,331,437 | B2 | 6/2019 | Boss | |
| 10,515,123 | B2* | 12/2019 | Riggs | G06F 16/313 |
| 2003/0229890 | A1* | 12/2003 | Lau | H04L 69/329 |
| | | | | 717/168 |
| 2004/0003266 | A1* | 1/2004 | Moshir | H04L 63/0236 |
| | | | | 713/191 |
| 2008/0033775 | A1* | 2/2008 | Dawson | G06Q 10/0635 |
| | | | | 705/7.28 |
| 2008/0065974 | A1* | 3/2008 | Campbell | G06Q 10/107 |
| | | | | 715/200 |
| 2010/0070345 | A1* | 3/2010 | Abelow | G06Q 30/02 |
| | | | | 705/14.44 |
| 2012/0102543 | A1* | 4/2012 | Kohli | H04L 63/20 |
| | | | | 726/1 |
| 2014/0136277 | A1* | 5/2014 | Bassin | G06F 11/008 |
| | | | | 705/7.28 |
| 2016/0044058 | A1* | 2/2016 | Schlauder | H04L 63/1433 |
| | | | | 726/25 |
| 2016/0300252 | A1* | 10/2016 | Frank | G06F 16/24578 |
| 2017/0052875 | A1 | 2/2017 | Bhogal | |
| 2017/0091078 | A1* | 3/2017 | Atyam | G06F 11/3672 |
| 2018/0088929 | A1* | 3/2018 | Eberlein | G06F 8/65 |
| 2019/0012166 | A1* | 1/2019 | Boss | G06N 20/00 |
| 2019/0034640 | A1 | 1/2019 | Abdine | |
| 2019/0164095 | A1* | 5/2019 | Argyros | G06F 40/205 |
| 2020/0099773 | A1* | 3/2020 | Myers | H04L 67/1095 |
| 2020/0110600 | A1* | 4/2020 | Weldemariam | G06F 11/3604 |
| 2020/0134195 | A1* | 4/2020 | Youngberg | G06F 21/563 |

OTHER PUBLICATIONS

Tailoring ERP systems: a spectrum of choices and their implications author: L Brehm, published on 2001.*

Title: Staged deployment in mirage, an integrated software upgrade testing and distribution system, author: O Crameri et al, published on 2007.*

Title: The impact of software-as-a-service on business models of leading software vendors: experiences from three exploratory case studies; author: S Stuckenberg, published on 2011.*

Title: Assessing the risk of IT outsourcing; author: BA Aubert, et al; Published on 1998.*

Alvertis, et al., "User Involvement in Software Development Processes", Procedia Computer Science vol. 97, 2016, pp. 73-83, <https://www.sciencedirect.com/science/article/pii/S1877050916320981>.

Bajic, et al., "Leveraging Social Media to Gather User Feedback for Software Development", Proceeding Web2SE 11, Proceedings of the 2nd International Workshop on Web 2.0 for Software Engineering, pp. 1-6, <https://dl.acm.org/citation.cfm?id=1984702&CFID=1010934356&CFTOKEN=26943790>, published on 2011.

Correa, et al., "Integrating Issue Tracking Systems with Community-Based Question and Answering Websites", 2013 22nd Australian Conference on Software Engineering, pp. 88-96.

Garousi, et al., "When and what to automate in software testing? A multi-vocal literature review", Information and Software Technology vol. 76, Aug. 2016, pp. 92-117, <https://www.sciencedirect.com/science/article/abs/pii/S0950584916300702>.

Kergl, Dennis, "Enhancing network security by software vulnerability detection using social media analysis Extended Abstract", 2015 IEEE 15th International Conference on Data Mining Workshops, pp. 1532-1533.

Mell et al., "The NIST Definition of Cloud Computing", National Institute of Standards and Technology, Special Publication 800-145, Sep. 2011, 7 pages.

Morales-Ramirez, et al., "CrowdIntent: Annotation of Intentions Hidden in Online Discussions", 2015 IEEE/ACM 2nd International Workshop on Crowdsourcing in Software Engineering, pp. 24-29.

Storey, et a., "The (R)Evolution of Social Media in Software Engineering", FOSE 2014 Proceedings of the on Future of Software Engineering, pp. 100-116, <https://dl.acm.org/citation.cfm?id=2593887&CFID=1010934356&CFTOKEN=26943790>.

Veerman, Niels, "Automated mass maintenance of a software portfolio", vol. 62, Issue 3, Oct. 15, 2006, pp. 287-317, <https://www.sciencedirect.com/science/article/pii/S0167642306000827>.

* cited by examiner

CHART A

DATA ANALYTICS TO DETERMINE SOFTWARE MAINTENANCE ADVISORY USING INPUT DATA

BACKGROUND

The present disclosure relates to advising on computer software upgrade decisions for enterprise software, and more particularly, advising on computer software upgrade decisions for enterprise software by correlating respective vendor information with influences from user data.

Upgrading software application especially for large business which have many users and a plurality of enterprise software application can be a time consuming process and can result in problems. Such problems can include updates that do not work as advertised, system slowdown due to updates, computers or software crashing due to updates of software.

Software products can be continuously improved with new features and bug fix patches. These improvements can be released across many versions of the software product. While a new version of software will offer improvements, software users must weigh the risks of upgrading the software, which includes effort of installation, system compatibility, and software behavior.

In one example, to make software upgrade decisions, users can manually browse through documentation as well as internet social networks discussing software and software updates. However, perusing documentation and public website comments on software implementations can require sifting through a large amount of data and be time consuming.

SUMMARY

The present disclosure recognizes the shortcomings and problems associated with current methods and systems for advising on software updates, especially in an enterprise environment. Software users should also consider a version's end-of-life and end-of-support dates. In large organizations with many interconnected systems, software upgrade decisions are complex and have significant business impact.

The method and system of the present invention provides a recommendation for a software-update decision based on associated risks and taking into account feedback from public social media networks hosting user comments on software and software updates. Thereby, large companies or enterprises which need to constantly check for several software patches to keep software up-to-date and deliver services with proper service level agreements (SLA). Such user comments may also include descriptions on possible software bugs generated by a software update, and sentiment analysis, which can be used to detect how users are affected by updates and the complexity of the solutions to fix software update issues. System automatically compiles social media texts related to a software upgrade decision and produces recommendation based on understanding of those texts along stated dimensions of importance. The method and system of the present invention can use user surveys from which ratings for a plurality of dimensions become training data labels for a neural network tasked with understanding social media data relative to a dimension.

According to an aspect of the present invention, a method for advising on computer software upgrade decisions for enterprise software by analyzing respective vendor information correlated to influences from user data, includes periodically checking, using a control system having a computer, for vendor software updates for selected software programs by respective one or more users, using a communications network. The method includes assessing software update risks based on a plurality of factors, and the factors including dimensions of importance of each of the factors, a dimension being an aspect of a factor having an importance for a user. The method includes gathering user data as opinion and comments from users on public websites, and generating a user data score from the gathered user data. The method includes weighting each of the dimensions for each of one or more factors for a selected software program, the weighting being based on an importance for each of the dimensions for a respective user, and the user data score. The method includes calculating a risk score based on the assessed software update risk for each dimension which includes the weighting of each of the dimensions; and sending a notification to a user recommending the software upgrade or not based on the risk score.

In a related aspect, the factors include a software version's end of life and an end of support dates.

In a related aspect, the method includes calculating an average risk score of each dimension and multiplying by an importance score for each dimension; calculating an average score for each dimension for each software program and multiplying by the importance score for each dimension; and re-weighting the dimensions based on the average score and the average risk score; and sending a notification to the user recommending the vendor software upgrade or not recommending the vendor software upgrade based on the risk score.

In a related aspect, the method includes generating a risk management model based on the assessed software update risks including the weighting of each of the dimensions and the risk score; sending the notification to the user recommending the vendor software upgrade or not recommending the vendor software upgrade based on the risk management model including the risk score.

In a related aspect, the method includes re-weighting the dimensions based on the user data score, after a first weighting for each of the dimensions for each of one or more factors for the selected software program, wherein the first weighting is based on the importance for each of the dimensions for a respective user; and sending a notification to a user recommending the vendor software upgrade or not recommending the vendor software upgrade based on the risk management model after the re-weighting.

In a related aspect, the method includes gathering user data as opinion and comments from one or more surveys, wherein the user data is related to the software and the software updates.

In a related aspect, the method includes the gathered user data as opinion and comments from one or more surveys is used in the generation of the user data score in addition to the user data form the users on the public websites.

In another aspect according to the present invention, a system for advising on computer software upgrade decisions for enterprise software by analyzing respective vendor information correlated to influences from user data includes a computer system comprising: a computer processor, a computer-readable storage medium, and program instructions stored on the computer-readable storage medium being executable by the processor, to cause the computer system to: periodically check, using a control system having a computer, for vendor software updates for selected software programs by respective one or more users, using a communications network; assess software update risks based on a plurality of factors, the factors including dimensions of importance of each of the factors, a dimension being an aspect of a factor having an importance for a user; gather user data as opinion and comments from users on public websites; generate a user data score from the gathered user data; weight each of the dimensions for each of one or more factors for a selected software program, the weighting being based on an importance for each of the dimensions for a respective user, and the user data score; calculate a risk score based on the assessed software update risk for each dimension which includes the weighting of each of the dimensions; and send a notification to a user recommending the software upgrade or not based on the risk score.

In another aspect according to the present invention, a computer program product for advising on computer software upgrade decisions for enterprise software by analyzing respective vendor information correlated to influences from user data, includes the computer program product comprising a computer readable storage medium having program instructions embodied therewith, wherein the computer readable storage medium is not a transitory signal per se, and the program instructions executable by a computer to cause the computer to perform a method, comprising: periodically checking, using a control system having a computer, for vendor software updates for selected software programs by respective one or more users, using a communications network; assessing software update risks based on a plurality of factors, the factors including dimensions of importance of each of the factors, a dimension being an aspect of a factor having an importance for a user; gathering user data as opinion and comments from users on public websites; generating a user data score from the gathered user data; weighting each of the dimensions for each of one or more factors for a selected software program, the weighting being based on an importance for each of the dimensions for a respective user, and the user data score; calculating a risk score based on the assessed software update risk for each dimension which includes the weighting of each of the dimensions; and sending a notification to a user recommending the software upgrade or not based on the risk score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

FIG. 2 (Cont.) is a flow chart illustrating a method continuing from the method depicted in the flow chart shown in FIG. 2.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
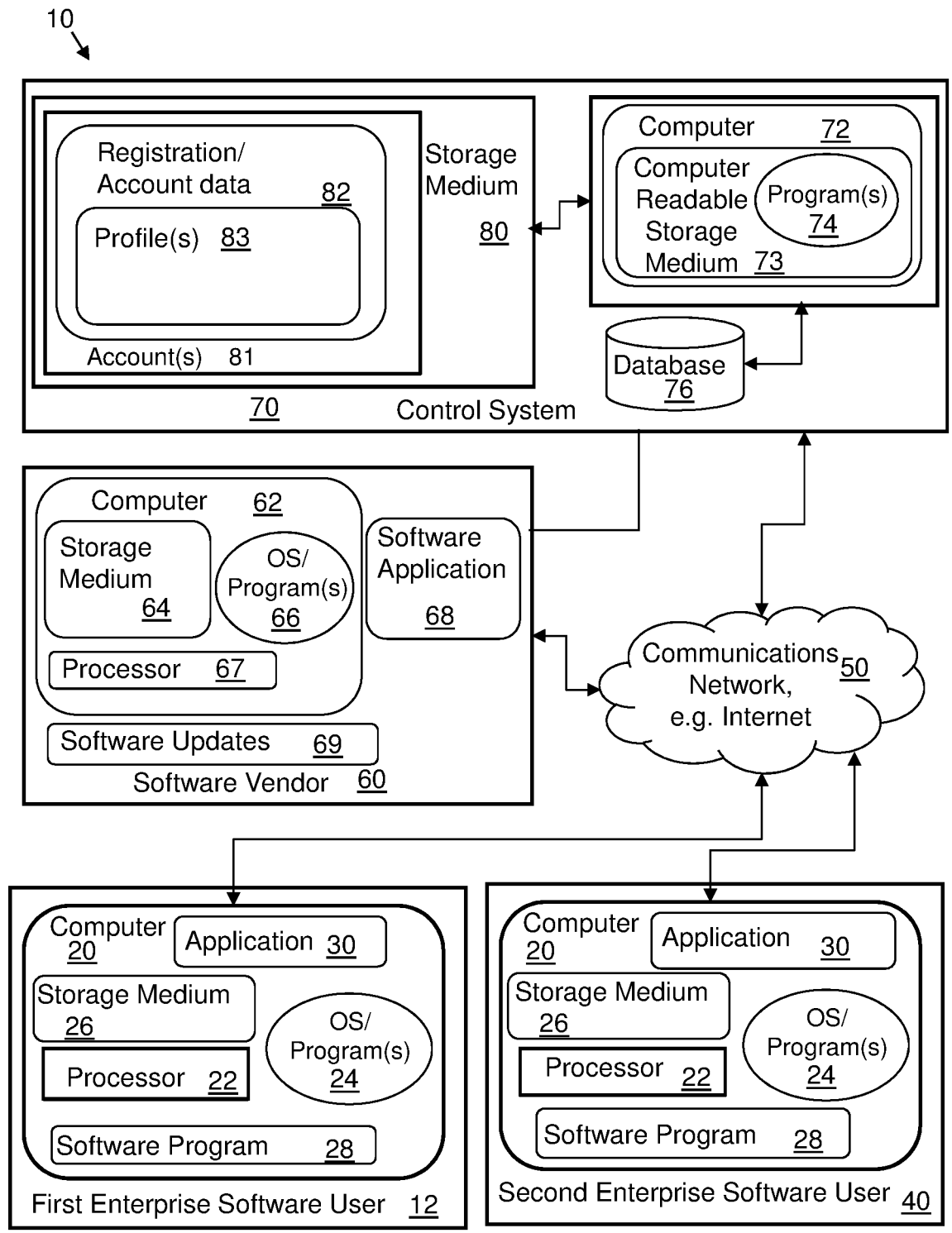
FIG. 1 is a schematic block diagram illustrating an overview of a system and methodology for advising on computer software upgrade decisions for enterprise software upgrade decisions by correlating respective vendor information with influences from user data.
Figure 2:
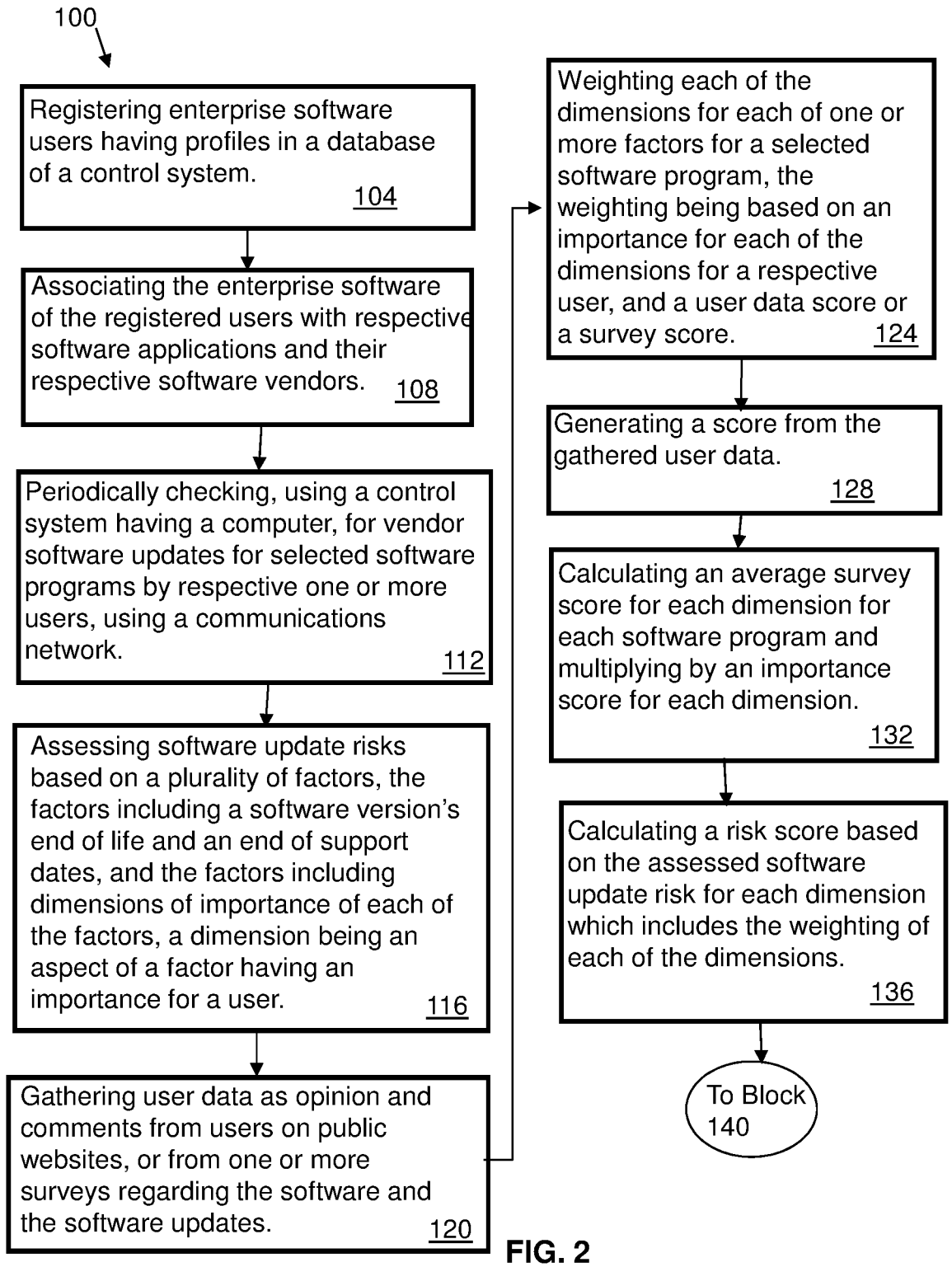
FIG. 2 is a flow chart illustrating a method, implemented using the system shown in FIG. 1, for advising on computer software upgrade decisions for enterprise software by correlating respective vendor information with influences from user data, according to an embodiment of the present invention.

Referring to FIGS. 1 and 2, a method 100 (FIG. 2) with reference to a system 10 (FIG. 1) according to an embodiment of the present disclosure is provided for advising on computer software upgrade decisions for enterprise software by correlating respective vendor information with influences from user data. The method 100 includes registering 304 (see FIG. 5) enterprise software users, for example, first enterprise software user 12 and second enterprise software user 40, having profiles 83 for user registrations and/or user accounts 82 in a storage medium 80, for example a database 76 of a control system 70, as in block 104. The user registrations and accounts can be referred to as user data 312 (see FIG. 5).

The method includes associating the enterprise software or software program 28 of the registered users, in this example, first enterprise software user 12 and second enterprise software user 40, with respective software applications. The software applications are represented by the software application 68 of the software vendor 60, as in block 108.

The method includes periodically checking 308 (see FIG. 5), using the control system 70 having a computer 72, for vendor software updates 69 of a software application 68 for selected software programs by respective one or more users of enterprise software, using a communications network 50, as in block 112.

Figure 5:
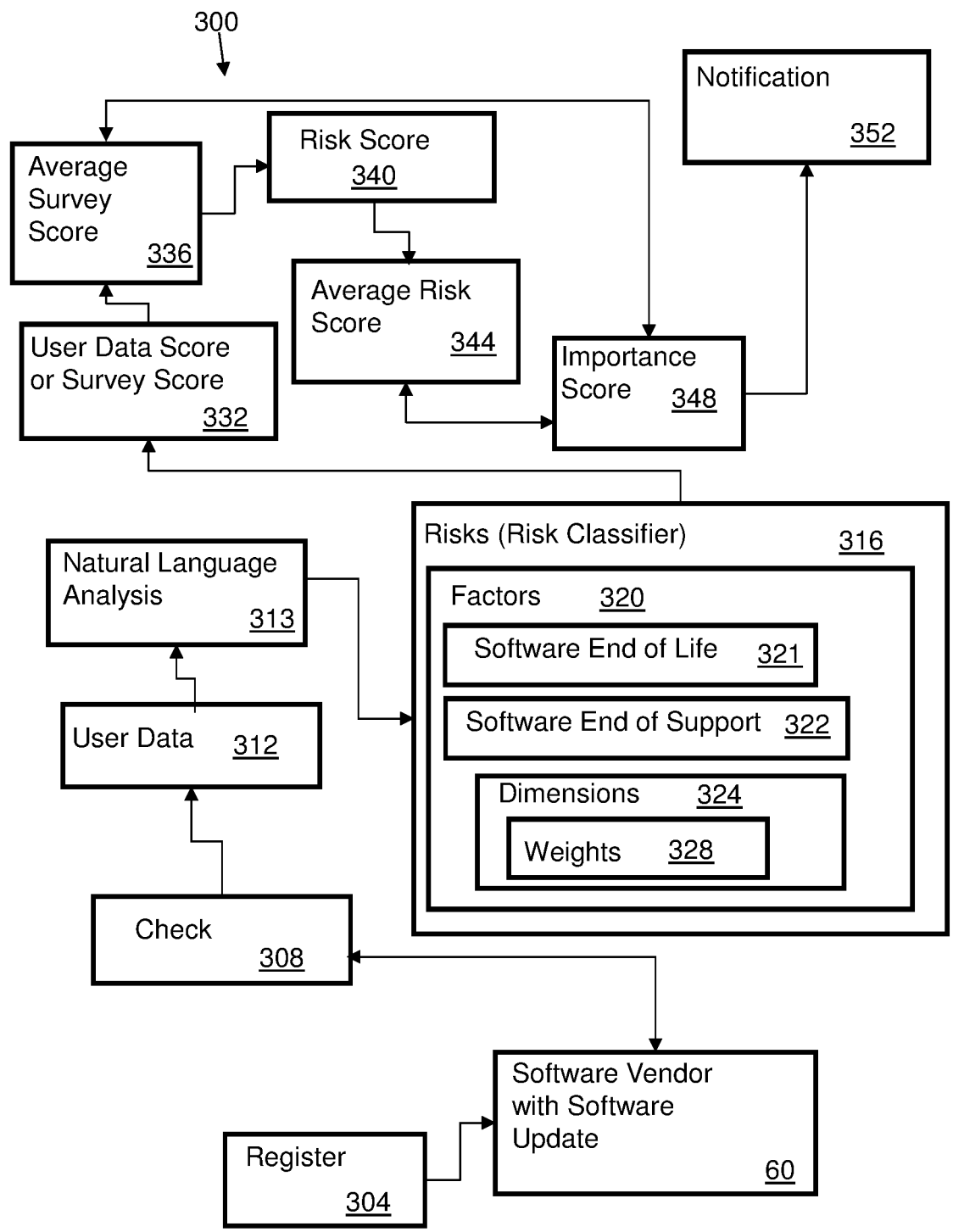
FIG. 5 is a functional block diagram for instructional purposes illustrating features of the present invention in association with the embodiments shown in FIGS. 1, 2, 3, and 4 for advising on computer software upgrade decisions for enterprise software by correlating respective vendor information with influences from user data, according to embodiments of the invention.

It is understood that the features shown in FIG. 5 are functional representations of features of the present disclosure. Such features are shown in the embodiment 300 of the system and method of the present disclosure for illustrative purposes to clarify the functionality of features of the present disclosure.

In the embodiment of the present disclosure shown in FIG. 1, a first enterprise software user 12 and a second enterprise software user 40 communicate with the communication network 50 to check for software updates 69 from a software vendor 60. In the embodiment of the present disclosure shown in FIG. 2, it is envisioned that the first enterprise software user and second enterprise software user are different enterprises or companies. Although two enterprise users are shown in the embodiment, it is envisioned that a plurality of other users may be applied and use the method and systems disclosed herein, and the embodiment according to FIG. 1 is shown for convenience and as an example. For each of the software users a computer 20 includes storage medium 26, programs and/or operating system 24, and a processor 22. The computer includes the software program 28, and an application 30 which in one embodiment of the present disclosure encompasses the method(s) disclosed herein. Such computer system is shown as an example and not intended to limit other combinations and examples.

Additionally, the software vendor 60 includes software updates 69 of software or a software application 68 which includes a computer 62 having a storage medium 64 and programs/operating system 66, and a processor 67. Such computer system is also shown as an example and not intended to limit other combinations and examples. Additionally, computer features are shown generically herein in FIG. 8 referring to one or more computer systems 1010.

It is envisioned that in addition to the example shown in FIG. 1, other embodiments of the present disclosure may include a plurality of enterprise software users, each using a plurality of software having respective software vendors. Such enterprise software users can include a plurality of companies, and such software vendors can be related to a number of software applications, each having a software updates and/or software update schedules, thereby a multiplicity of combinations of enterprise software users and software vendors and software applications are possible. The embodiment and example of FIG. 1 is shown as one embodiment and example for convenience and not intended to limit other combinations and examples.

In the embodiment shown in FIG. 1, the first enterprise software user 12 and the second enterprise software user 40 may have one or more computers, for example, a mobile device, a computer, a laptop computer, or a desktop computer, or a tablet having a computer.

The method 100 according to an embodiment of the present disclosure, can be incorporated in one or more computer programs or an application and stored on an electronic storage medium. It is envisioned that the application can access all or part of instructions necessary to implement the method of the present disclosure. The program or application can communicate with a remote computer system via a communications network 50, e.g., the Internet, and access data, and cooperate with program(s) stored on the remote computer system.

In the embodiment of the disclosure shown in FIGS. 1 and 2, the method 100 is incorporated in an application 30 stored on the computer 20. The application can be in communication with the control system 70 via the communications network 50. The control system 70 includes a computer 72 having a database 76 and one or more programs 74. In the embodiment of the disclosure shown in FIG. 1, the application 30 communicates with the control system 70 and the one or more programs 74 stored on a computer readable storage medium 73. The control system includes the computer 72 which also has access to the database 76. The control system 70 includes a storage medium 80 for maintaining a registration 82 of users and their devices for collaboration with the software vendor 60. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application. The application is stored on a device, for example, the computer 20, and can access data and additional programs at a back end of the application, e.g., control system 70.

In one embodiment of the present disclosure, the control system 70 includes a storage medium 80 for maintaining a registration and account data 82 of accounts 81. The registration and account data 82 can include associated profiles 83. The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the computer, as in the example shown in FIG. 1 of the computer 20 having the application 30. The application 30 is stored on the computer 20 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on the computer 20. It is envisioned that the control system 70 can not only store the profile of users, but in one embodiment, can interact with a website for viewing on a display of a device using the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Regarding any collection of data with respect to the present disclosure, such uploading or generation of profiles is voluntary by the one or more users, and thus initiated by and with the approval of a user. Thereby, a user can opt-in to establishing an account 81 having a profile 83 according to the present disclosure. Such approval also includes a user's option to cancel such profile or account, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary, and a user may request deletion of data (including a profile and/or profile data), un-registering, and/or opt-out of any registration. It is understood that such opting-out includes disposal of all data in a secure manner.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, the AI device 30 is associated with an AI system 60, remote from the AI device. Such an AI system can be represented by one or more servers storing programs on computer readable medium which can communicate with one or more AI devices. The AI system can communicate with the control system, and in one or more embodiments, the control system can be all or part of the AI system or vice versa.

The method 100 includes assessing software update risks 316 (see FIG. 5) based on a plurality of factors 320. The factors include a software version's end of life 321 and an end of support dates 322. Also, the factors include dimensions of importance 324 of each of the factors. A dimension being an aspect of a factor having an importance for a user, as in block 116. An importance for a user can include, for example, a user wanting the most up to date software, or software to run at a fastest speed. For instance, one factor can include a user having the latest software, and one aspect of the factor can be how the update effects the speed at which the software and/or the computer can run.

The method of 100 includes gathering user data 312 as opinion and comments from users on public websites or from one or more surveys, extended to a plurality of users and with input data received at the control system regarding the software and the software updates, as in block 120. The user data can be extracted using natural language analysis 313 from the public websites or surveys.

The method includes weighting 328 (see FIG. 5) each of the dimensions for each of one or more factors for a selected software program, the weighting being based on an importance for each of the dimensions for a respective user, and a user data score based on surveys, as in block 124. The importance score can be generated based on the importance of factors and dimensions for each of the users.

The method includes generating a score 332 from the gathered user data, as in block 128. The user data score can be generated from surveys, e.g., survey scores, and/or data from comments and reviews of users on public websites or social media directed to reviews and discussion of software and software updates.

The method includes calculating an average user data score 336 (also referred to as an average survey score) for each dimension for each software program and multiplying by an importance score 348 for each dimension, as in block 132.

The method includes calculating a risk score 340 based on the assessed software update risk for each dimension which includes the weighting of each of the dimensions, as in block 136.

Calculating an average risk score 344 of each dimension and multiplying by an importance score 348 for each dimension, as is block 140.

The method includes sending a notification 352 to a user recommending the software upgrade or not, based on the risk score, as in block 144.

An Embodiment According to the Present Disclosure

Figures 2, 3:
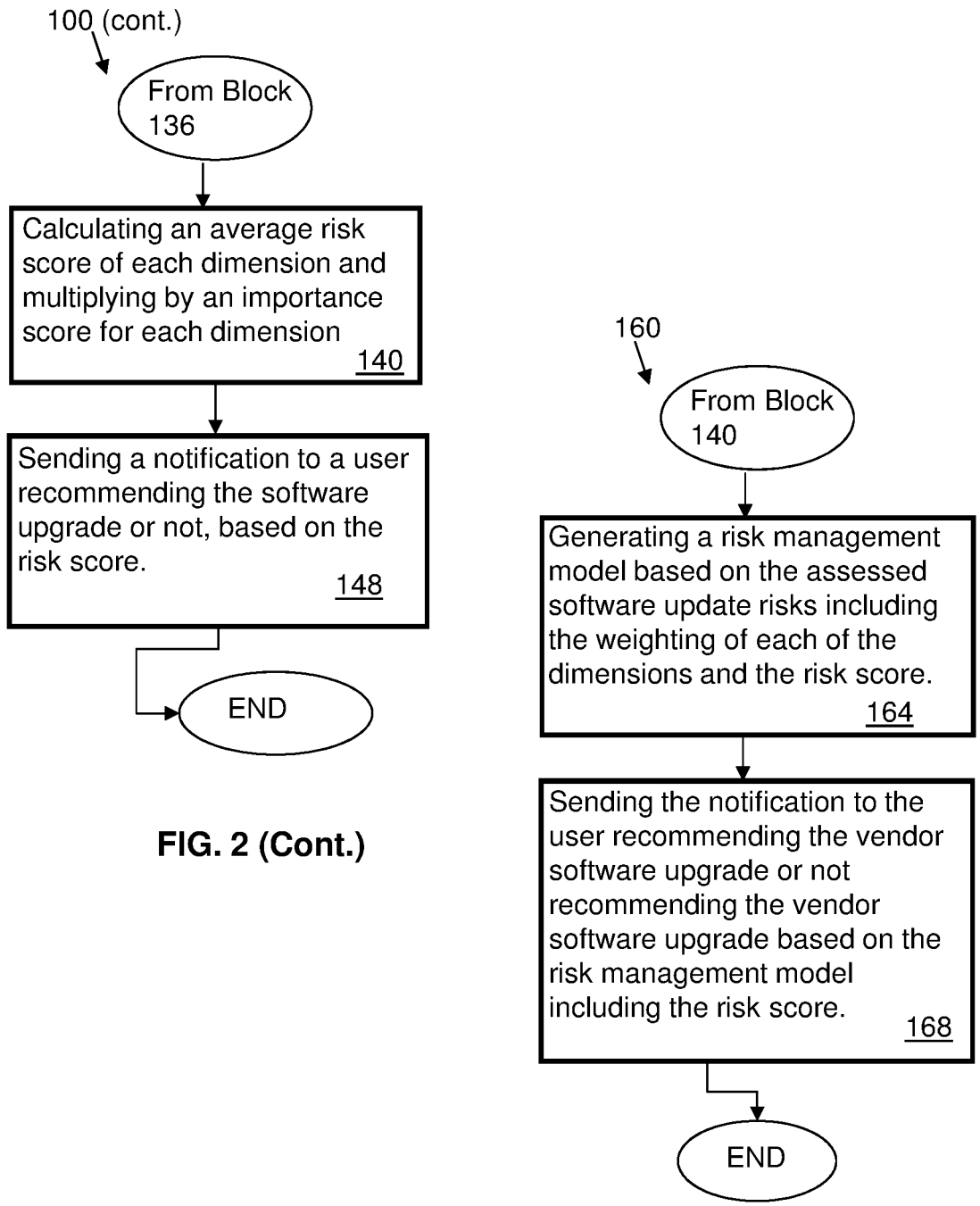
FIG. 3 is flow chart illustrating a method, according to another embodiment of the invention which is a variation of the method shown in FIG. 2 and continues from a block of FIG. 2 as indicated.

Referring to FIG. 3, according to one embodiment of the method and system of the present disclosure a method 160 continues from block 140 of the method 100 shown in FIG. 2, and includes generating a risk management model based on the assessed software update risks including the weighting of each of the dimensions and the risk score, as in block 164.

The method 160 includes sending the notification to the user recommending the vendor software upgrade or not recommending the vendor software upgrade based on the risk management model including the risk score, as in block 168.

Another Embodiment According to the Present Disclosure

Figure 4:
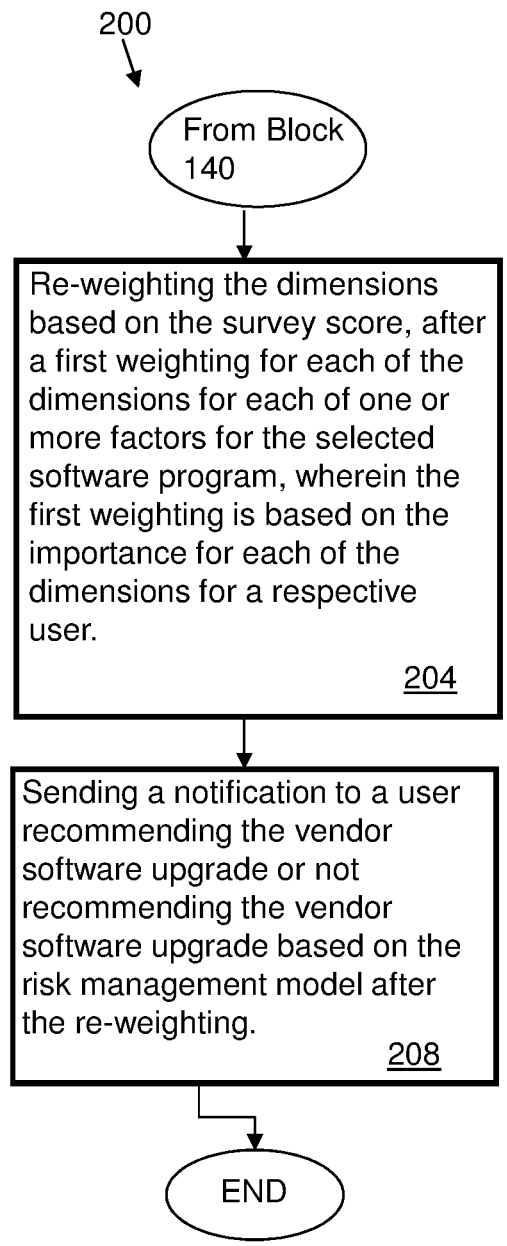
FIG. 4 is flow chart illustrating a method, according to another embodiment of the invention which is a variation of the method shown in FIG. 2 and continues from a block of FIG. 2 as indicated.

Referring to FIG. 4, according to one embodiment of the method and system of the present disclosure a method 200 continues from block 140 of the method 100 shown in FIG. 2, and includes re-weighting the dimensions based on the survey score, after a first weighting for each of the dimensions for each of one or more factors for the selected software program, as in block 204. The first weighting is based on the importance for each of the dimensions for a respective user.

The method includes sending a notification to a user recommending the vendor software upgrade or not recommending the vendor software upgrade based on the risk management model after the re-weighting, as in block 208.

Another Embodiment According to the Present Disclosure

Figure 6:
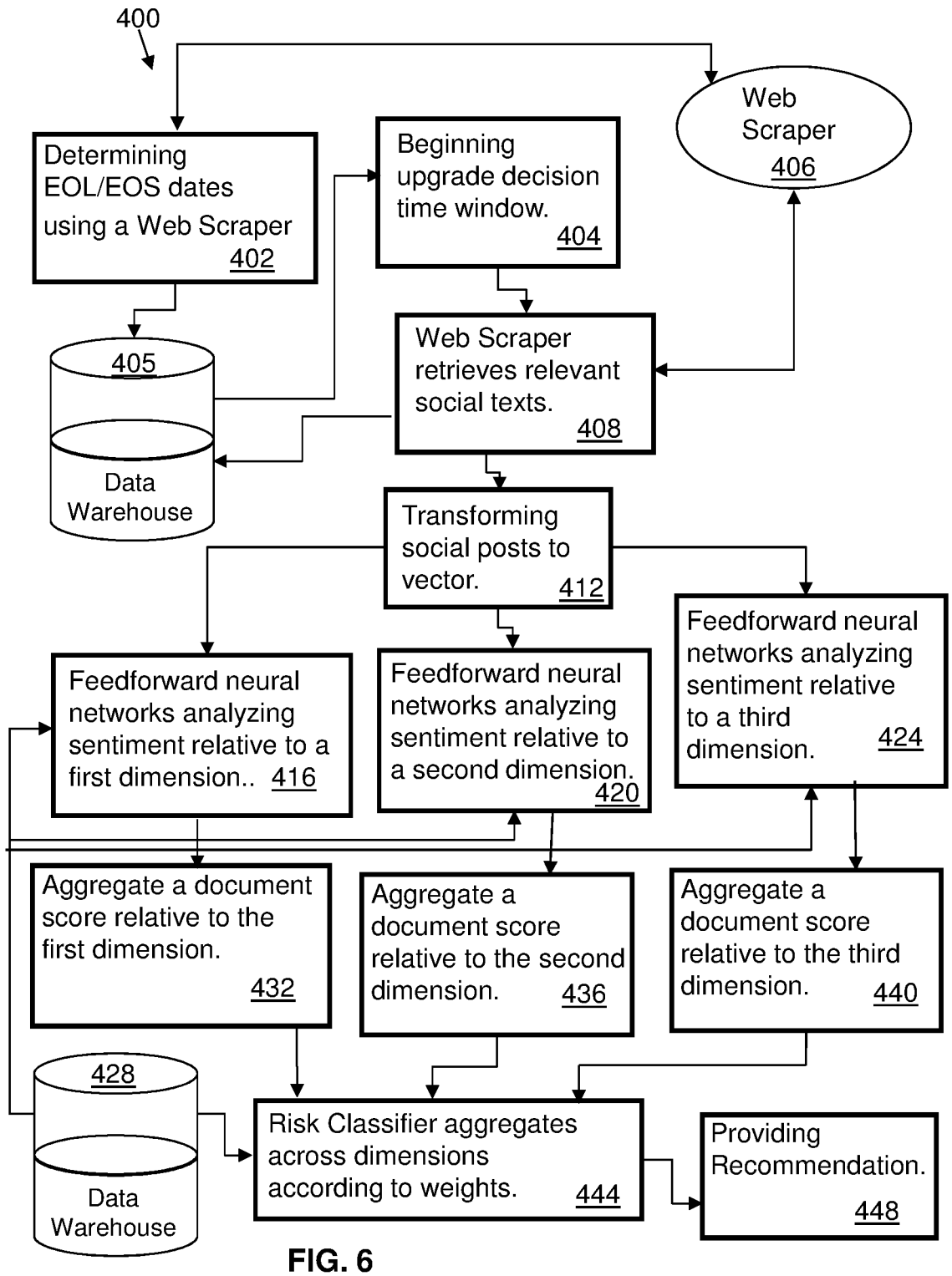
FIG. 6 is a functional block diagram of another embodiment according to the present disclosure for advising on computer software upgrade decisions for enterprise software by correlating respective vendor information with influences from user data, according to embodiments of the invention.

Referring to FIG. 6, according to one embodiment of the method and system of the present disclosure, a system 400 advises on computer software upgrade decisions for enterprise software by correlating respective vendor information with influences from user data. The system 400 includes training a neuro-linguistic programming (NLP) model on language specific to software upgrade dimensions.

Figure 7:
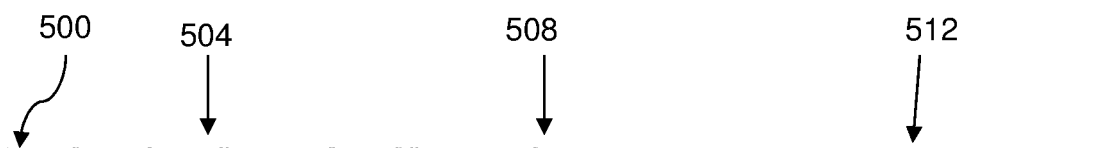
FIG. 7 is a chart of example dimensions with respect to the embodiment of the present disclosure shown in FIG. 6.

For example, referring to CHART A 500 in FIG. 7, a "Performance" dimension 520 (see FIG. 7) can be trained that words such as "low downtime", "fast", "reliable", equal good or acceptable qualities related to the software upgrade, and words or phrases such as, "high downtime", "slow", "unreliable", equal bad or unacceptable qualities related to the software upgrade. The chart A 500 has three columns depicting dimension 504, dimension score 508 which score can range from 0 to 10, and dimension importance 512 which score can range from 0-10.

A web scraper 406 can programmatically access vendor websites and locate End-of-Life 321 and End-of-Service 322 (EOL/EOS) dates for the currently used software version, as in block 402. These dates are stored in a data warehouse 405 and are considered by the risk classifier 316.

Once the EOL and EOS dates are determined, the system 400 initiates research regarding a software upgrade decision, as in block 404.

The web scraper 406 programmatically searches social media sites such as website directed to software, software downloads, and include user comments and reviews, and software community forums, for keywords relevant to the upgrade version under consideration. The retrieved data regarding upgrade versions under consideration are stored in the data warehouse 405.

The system 400 includes receiving an input data vector on each post from social media after creating the input data vector for a series of feedforward neural networks (FNN). A neural network is trained for each dimension and each network outputs a score for its dimension. For each dimension, the scores for all documents are averaged to generate an aggregate score for the software upgrade relative to the dimension. A weighted average is taken across all dimensions. The aggregate score for each dimension is multiplied by that dimension's importance weight. Then, all dimensions are totaled.

The system 400 can generate and issue a survey several weeks after the upgrade to stakeholders asking for ratings along each dimension and an importance score for each dimension. An average survey score for a dimension can be added as a label associated with a document vector as training data for that dimension's neural network.

An average survey importance for a dimension can be incorporated into the weighting of each respective dimensions for similar upgrades in the future.

Calculation of risk on software upgrade using opinions and comments on public websites or surveys use: natural language processing to extract relevant text related to software. Complexity of software upgrade using sentiment analysis on how users have been affected by such updates (including, text related to how they are satisfied with the results, and the number of trials until success is achieved, using for instance people with similar issues to upgrade software).

The methods and systems of the present disclosure thereby use cognitive data analytics or cognitive analytics to analyze the data from the software vendors and user data to arrive at a risk score.

The embodiments of the present disclosure can include analysis of a software dependency graph described in social text post, vendor website, and collection of servers that need upgrade.

Relevant text can be used to create an input data vector for series of feedforward neural networks (FNN) to determine weight of each dimension.

The method and system of the present disclosure can include reconfiguring weight of time of posts in relation to use end of life dates and end of support dates based on impact of software update.

Based on the present disclosure, each enterprise that implements the methods and systems of the present disclosure can have different preferences for the dimensions that matter most to the particular enterprise. Prior manual survey scores can be used for a particular dimension to train a model that automatically scores future posts on that particular dimension. This ensures that the model is tailored to the enterprise's individual preferences. Such a model is trained for each dimension that is considered. Further, the solution produces scores for each dimension individually as well as an aggregate score, which is weighted according to the enterprise's stated importance of each dimension.

In one example, a client may consider security more heavily than a performance dimension. In another example, a client may consider application speed more heavily than a performance dimension. Using survey labels for the individual client, a performance model can be trained to assess relative to the individual client's particular considerations.

Embodiments and examples according to the present disclosure provides an automated approach to identifying and gathering the End-of-Support and/or End-of-Life dates published at the respective vendor site for each software used in an enterprise. In one example, a large enterprise using enterprise software products from diverse number of vendors can have a challenge maintaining software currency and complying. The present disclosure provides a solution to an enterprise to avoid having out-of-date or obsolete software systems and helps with auditing processes, avoiding security exposure to vulnerabilities, risk, and threats.

Subsequent to gathering the EOS/EOL dates from the respective vendor, embodiments of the present disclosure associates a score to signify and influence the urgency and impact of the upgrade by aggregating the following, for example: end of support/end of life dates published by the respective vendor; support definitions of each vendor (ex: extended support, limited support, premium support); enterprise client software upgrade policy compatibility matrix and prerequisites/dependencies for the respective software and the version known risks; assumptions and issues published by the vendor plus the expertise from the users in the social media (using public available data).

In one example, different enterprise clients within a large company can have different models of risk management considering different dimensions. The dimensions can be derived from Natural language processing to extract information, and calculation of the dimensions can be based on the analysis of this collected data, and feedforward neural networks (FNN).

A software dependency graph can be used to analyze both collected remote data and all enterprise software systems from multiple servers and vendors in the IT infrastructure. The embodiments of the present invention can reconfigure weight of time of forum posts in relation to use end of life dates and end of support dates based on urgency and impact of a software update.

The embodiments and examples of the present disclosure provide recommendations based on understanding of collected data from social media and vendor web sites along with stated dimensions of importance for the software upgrade. Thereby, the present disclosure provides cognitive computing which provides intelligent initiation of updates.

Embodiments and examples according to the present disclosure provides a method and system for advising on software upgrade decisions by correlating respective vendor information related to end of life, and end of support dates. The method and system configures a set of dimensions considered for a software upgrade, including, for example, end of life and end of support risk averted, performance, compatibility process change ease, new feature benefit, and general satisfaction. The method and system can calculate risk of software upgrade based on opinion and comments from public websites or using one or more surveys regarding the software and the software updates. An average survey score for each dimension for each software program can be calculated, and multiplied by the importance score for each dimension. The method and system can include sending a notification to a user recommending the software upgrade or not based on the weighted dimensions, and calculation of risk on software upgrade using opinions and comments on public websites or surveys pertaining to use. The method and system further includes natural language processing to extract relevant text related to software; complexity of software upgrade using sentiment analysis on how users have been affected by such updates (including, for example, text related to how they are satisfied with the results; and the number of trials until success is achieved, using for instance people with similar issues to upgrade software). The method and system can include an analysis of software dependency graph described in social text post, vendor website, and collection of servers that need an upgrade. Relevant text is used to create an input data vector for a series of feedforward neural networks (FNN) to determine weight of each dimension. The weight of time of posts can be reconfigured in relation to use END of LIFE dates and END of SUPPORT dates based on an impact of software update.

Embodiments and examples according to the present disclosure provides a method and system, which can be implemented as a computer application for advising on a software upgrade decision by analyzing data, including correlating respective vendor information with insights from social networks. The application programmatically accesses multiple social network websites and searches using a variety of relevant search terms, in addition to pulling end-of-support date and associated information from the respective software vendor. Upon receiving results, the application assesses their relevance to the upgrade decision using natural language processing technology. The results that are determined to be relevant can be further analyzed for tone to understand which posts are positive regarding the new software version versus posts that are negative or neutral. Based on the analysis, the application calculates and presents a risk score signifying the decision to upgrade the software. Further, the application can tag a product roadmap and posts that contain discussion of the version's benefits/risks. One of the benefits of the present embodiment include that the application's search considers more data than users can manually consume, and the application greatly reduces the time spent searching.

Additional description of the components of the systems and methods of the present disclosure include, a Web Scraper 408 which programmatically accesses various social media and vendor documentation websites at regular intervals. Identifies EOL/EOS dates from vendor sites, downloads relevant texts from social media, and stores data in Data Warehouse. A Data Warehouse 405 which stores relevant software upgrade data such as EOL/EOS dates, extended support offering dates, support caveats, compatibility, review sentiment, relevant text passages. A Natural Language Processor 313 which analyzes social media texts that web scraper has downloaded. Each text can be analyzed by a series of feedforward neural networks (FNN) 416, 420, 424 that correspond to each dimension the Risk Classifier 316 can consider in the upgrade decision. The Risk Classifier can consider each dimension on which the upgrade is being analyzed to reach a recommendation. Factors may include compatibility, implementation effort, performance changes, and other factors such as organization policies to rank order the risks and benefits that are presented to the user. Uses a weighting system established by administrators and feedback from post upgrade surveys. A notification system can alert users as EOL/EOS dates approach or are added, informs users as new software versions become available. Adjustable according to user preferences, and can send surveys to project stakeholders after a software application goes live.

In general, the present disclosure can include embodiments and examples that include a system and method for recommending and providing insights to the software upgrade decision. The system and method includes gathering the key details and/or terms and conditions of vendor support related information for the obsolete version and the new/beta versions from the respective vendor websites. The system and method includes determining via social media data and natural language processing the feedback of users who upgraded the software. Complexity, errors, and benefits of upgrading the software are determined, and justification for the software upgrade decision with evidences and support material is used to minimize risks. The system and method automatically notifies or alerts a user recommending or, mandating based on corporate policy, a software upgrade.

Enterprise users or owners can be stakeholders of an enterprise who maintain inventory of software(s) used in the enterprise and the organizational policies associated with the software upgrade. Product Vendors can maintain vendor websites including publishing the dates pertaining to EOL/EOS and extended support and associated support related information in their websites. Other users can include general users who provides inputs or feedback on their experience with the upgrade of respective products. An enterprise user can include a person who is responsible for assessing and evaluating the upgrade decisions of the software product.

In one example according to the preset disclosure, a weight and threshold to determine each risk level can be defined by the system administrator responsible for patching software systems. For example, scoring weight adjustments can include users adjusting the scoring formula, and a system which can store weight adjustments and apply to future upgrade assessments. The scoring formula can use different weights based on factors relevant to the particular software upgrade.

Additional factors for risk classification can include, for example, a classification for vendors; a type of update (e.g., database, analytics, etc.); a number of software users; a client's annual revenue; a client's number of employees; and a client's length of relationship.

In another example, risk classifier levels can include, for example, a high risk which can include trustworthiness, wherein recommended software versions can be Incorrect and not tested which can cause an impact of crash of system, abnormal behavior, loss of data etc. A moderate risk which can include incompatibility wherein a possibility that the recommended software version was only tested for a specific device and applications which might not be the appropriate software version for target device/s and running applications. Such a situation might cause incompatibility between target devices and running applications. A low risk which can include a small risk that a better version for target device/s was available which was never commented on forums.

In the present disclosure the systems and methods according to the present disclosure provides calculating an importance for each of the dimensions for a software program and calculating a risk score based on the software update risk assessment for each dimension. The methods and systems include calculating an average survey score for each dimension for each software program and multiplying by the importance score for each dimension and weighting the dimensions based on the average survey score and the average risk score. The method and system includes sending a notification to a user recommending the user to provide or not to provide software upgrade based on the weighted dimensions.

In the present disclosure the systems and methods according to the present disclosure provides a system and method which automatically compiles social media data related to comments and/or reviews of software updates which are related to a software upgrade decision. The method and system produces a recommendation based on a computer analysis, e.g., data analytics, and/or cognitive computing, to apply a weight to each of a plurality of dimensions and generate a risk score for use in recommending a software update.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
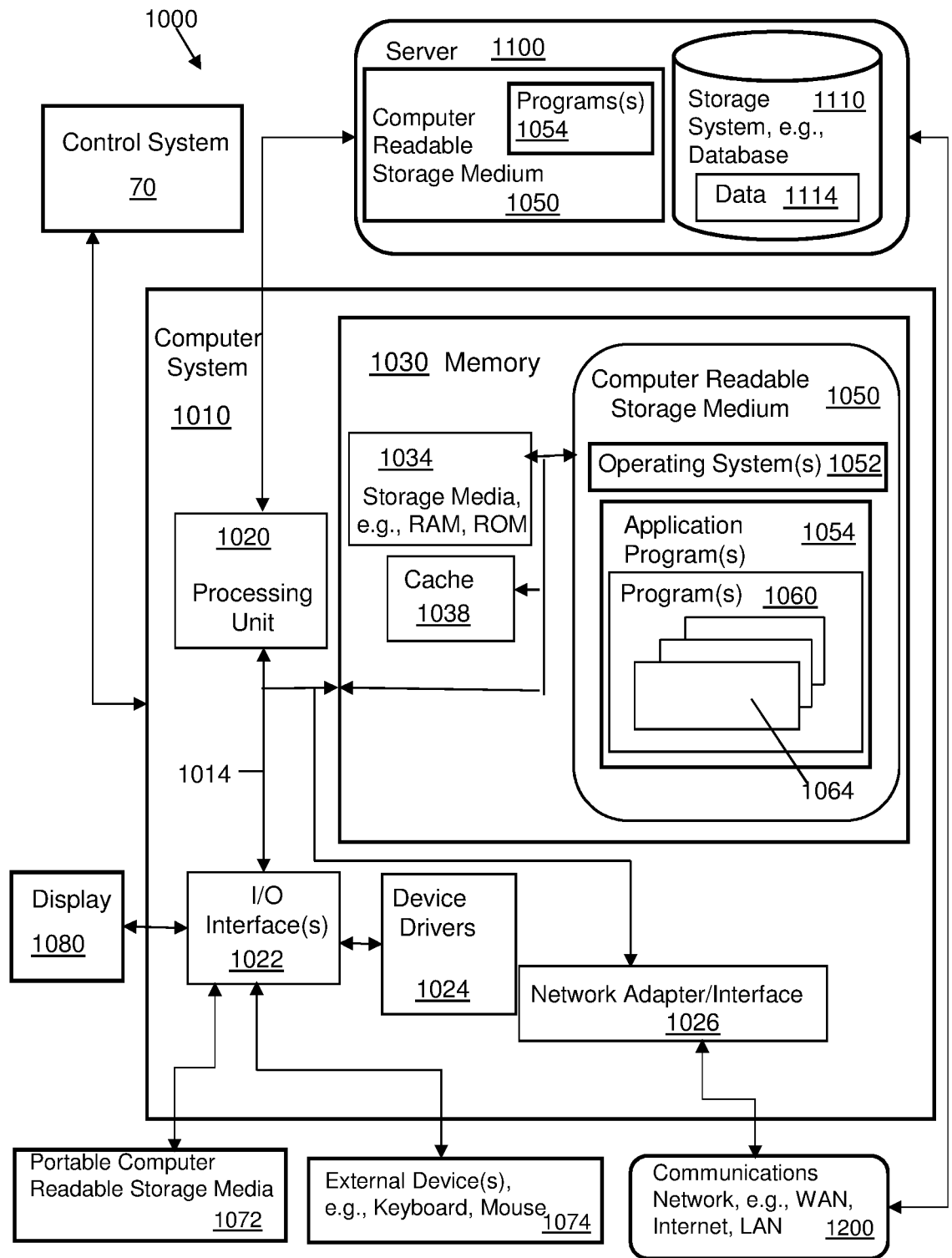
FIG. 8 is a schematic block diagram depicting a computer system according to an embodiment of the disclosure which may be incorporated, all or in part, in one or more computers or devices shown in FIG. 1, and cooperates with the systems and methods shown in FIGS. 1-6.

Referring to FIG. 8, a system or computer environment 1000 includes a computer system 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 can include all or part of the computer system 1010 and its components, and/or the control system can communicate with all or part of the computer system 1010 and its components as a remote computer system, to achieve the control system functions described in the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 9:
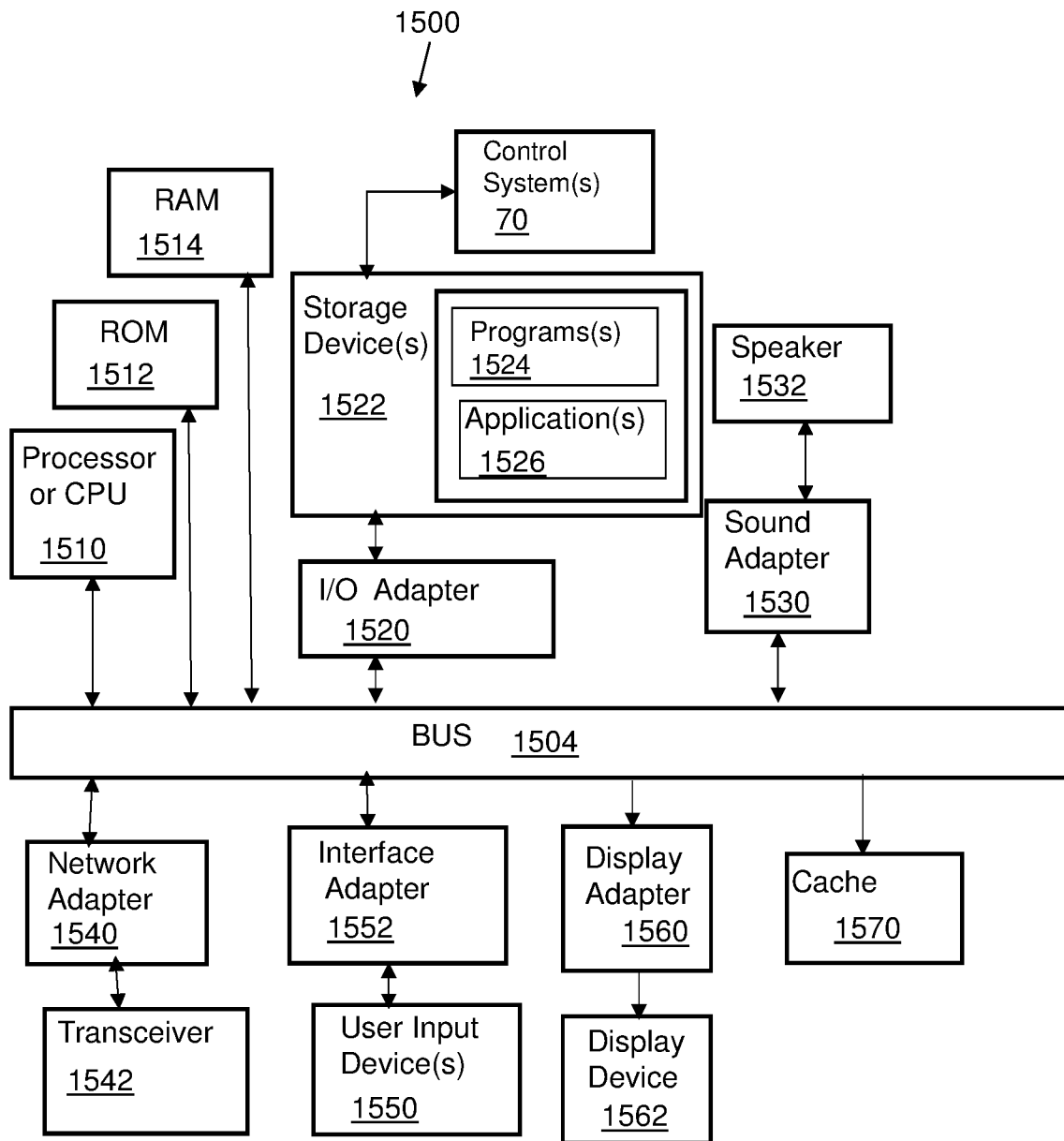
FIG. 9 is a schematic block diagram of a system depicting system components interconnected using a bus. The components for use, in all or in part, with the embodiments of the present disclosure, in accordance with one embodiment of the present disclosure.

Referring to FIG. 9, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
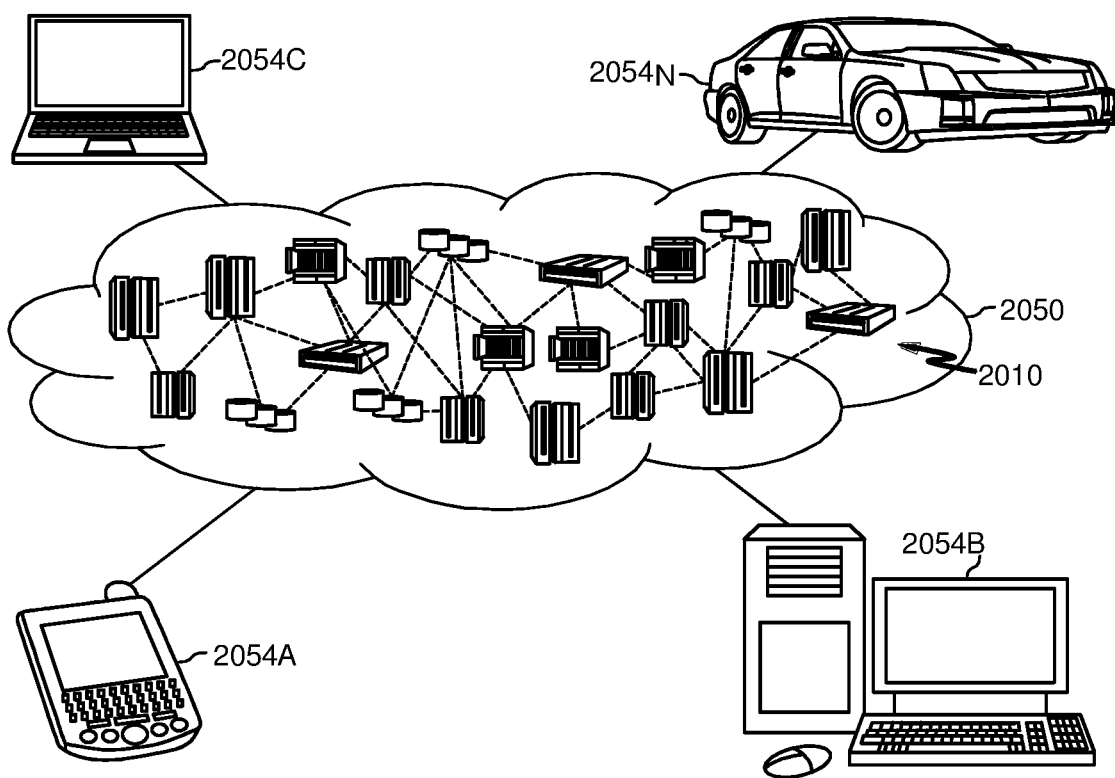
FIG. 10 is a block diagram depicting a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
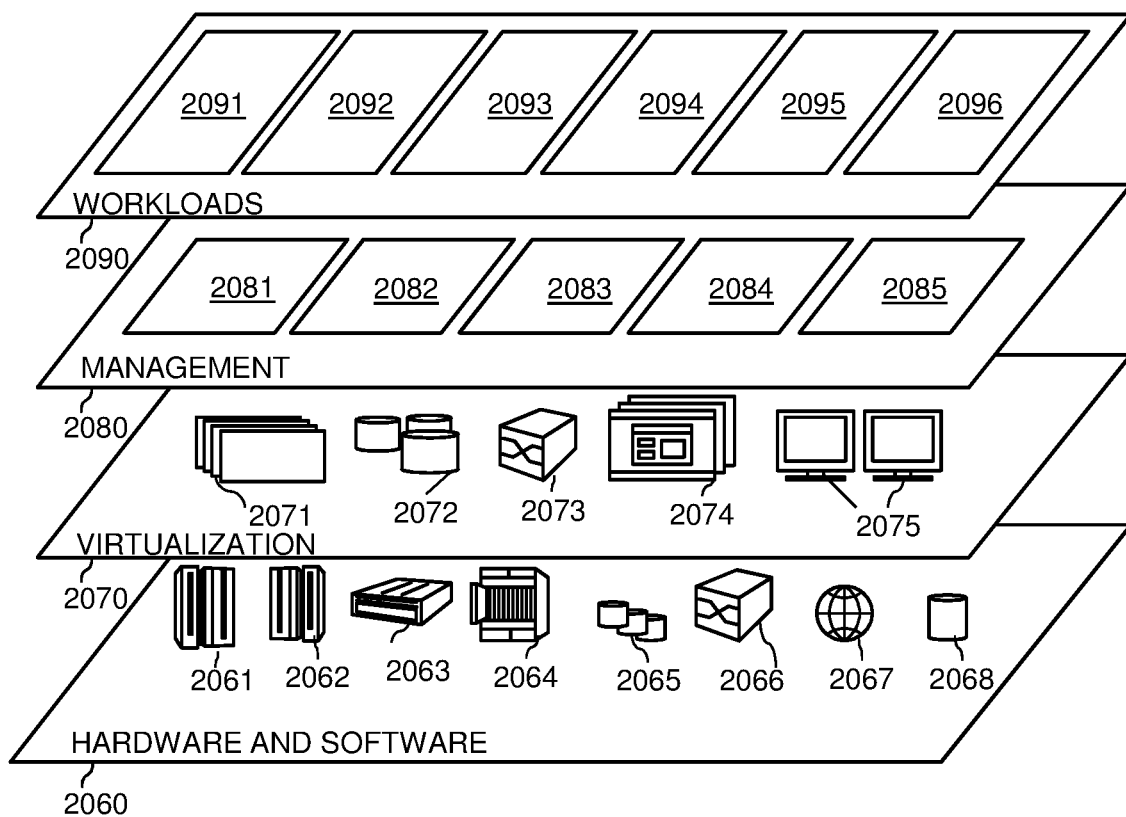
FIG. 11 is a block diagram depicting abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and advising on computer software upgrade decisions for enterprise software by analyzing respective vendor information correlated to influences from user data 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for advising on computer software upgrade decisions for enterprise software by analyzing respective vendor information and correlating to user data, comprising:
   periodically checking, using a control system having a computer, for a vendor software update for a selected software program by respective one or more users, using a communications network;
   assessing a software update risk for the vendor software update, based on a plurality of factors, the factors being issues regarding solutions to fix software updates, the factors including dimensions for each of the factors, a dimension being an aspect of a factor having an importance for a user for each of the dimensions, wherein one importance includes the user having a latest software, the importance being generated based on the importance of the factors and the dimension for the user;
   gathering, using natural language processing, user data as opinion and comments from users on public websites, the gathering of the user data including an opinion and a comment from one or more surveys, and the user data being related to the selected software program and the vendor software update;
   generating a user data score from the gathered user data;
   weighting each of the dimensions for each of one or more factors for the selected software program, the weighting being based on an importance for each of the dimensions for a respective user, and the user data score;
   calculating a risk score based on the assessed software update risk for each dimension and the weighting of each of the dimensions which includes the user data score; and
   sending a notification to a user recommending the vendor software update or not based on the risk score.

2. The method of claim 1, wherein the factors include a software version's end of life and an end of support dates.

3. The method of claim 1, further comprising:
   generating a risk management model based on the assessed software update risks including the weighting of each of the dimensions and the risk score; and sending the notification to the user recommending the vendor software update or not recommending the vendor software update based on the risk management model including the risk score.

4. The method of claim 1, further comprising:
re-weighting the dimensions based on the user data score, after a first weighting for each of the dimensions for each of one or more factors for the selected software program, wherein the first weighting is based on the importance for each of the dimensions for a respective user; and
sending a notification to a user recommending the vendor software update or not recommending the vendor software update based on the risk management model after the re-weighting.

5. The method of claim 1, wherein the gathered user data as opinion and comments from one or more surveys is used in the generation of the user data score in addition to the user data form the users on the public websites.

6. A system for advising on computer software upgrade decisions for enterprise software by analyzing respective vendor information and correlating to user data, which comprises:
a computer system comprising: a computer processor, a computer-readable storage medium, and program instructions stored on the computer-readable storage medium being executable by the processor, to cause the computer system to:
periodically check, using a control system having a computer, for a vendor software update for selected software program by respective one or more users, using a communications network;
assess a software update risk for the vendor software update, based on a plurality of factors, the factors being issues regarding solutions to fix software updates, the factors including dimensions for each of the factors, a dimension being an aspect of a factor having an importance for a user for each of the dimensions, wherein one importance includes the user having a latest software, the importance being generated based on the importance of the factors and the dimension for the user;
gather, using natural language processing, user data as opinion and comments from users on public websites, the gathering of the user data including an opinion and a comment from one or more surveys, and the user data being related to the selected software program and the vendor software update;
generate a user data score from the gathered user data;
weight each of the dimensions for each of one or more factors for the selected software program, the weighting being based on an importance for each of the dimensions for a respective user, and the user data score;
calculate a risk score based on the assessed software update risk for each dimension and the weighting of each of the dimensions which includes the user data score; and
send a notification to a user recommending the vendor software update or not based on the risk score.

7. The system of claim 6, wherein the factors include a software version's end of life and an end of support dates.

8. The system of claim 6, further comprising:
generating a risk management model based on the assessed software update risks including the weighting of each of the dimensions and the risk score; and
sending the notification to the user recommending the vendor software update or not recommending the vendor software update based on the risk management model including the risk score.

9. The system of claim 6, further comprising:
re-weighting the dimensions based on the user data score, after a first weighting for each of the dimensions for each of one or more factors for the selected software program, wherein the first weighting is based on the importance for each of the dimensions for a respective user; and
sending a notification to a user recommending the vendor software update or not recommending the vendor software update based on the risk management model after the re-weighting.

10. The system of claim 6, wherein the gathered user data as opinion and comments from one or more surveys is used in the generation of the user data score in addition to the user data form the users on the public websites.

11. A computer program product for advising on computer software upgrade decisions for enterprise software by analyzing respective vendor information and correlating to user data, the computer program product comprising a computer readable storage medium having program instructions embodied therewith, wherein the computer readable storage medium is not a transitory signal per se, the program instructions executable by a computer to cause the computer to perform a method, comprising:
periodically checking, using a control system having a computer, for a vendor software update for selected software programs by respective one or more users, using a communications network;
assessing a software update risk for the vendor software update, based on a plurality of factors, the factors being issues regarding solutions to fix software updates, the factors including dimensions for each of the factors, a dimension being an aspect of a factor having an importance for a user for each of the dimensions, wherein one importance includes the user having a latest software, the importance being generated based on the importance of the factors and the dimension for the user;
gathering, using natural language processing, user data as opinion and comments from users on public websites, the gathering of the user data including an opinion and a comment from one or more surveys, and the user data being related to the selected software program and the vendor software update;
generating a user data score from the gathered user data;
weighting each of the dimensions for each of one or more factors for the selected software program, the weighting being based on an importance for each of the dimensions for a respective user, and the user data score;
calculating a risk score based on the assessed software update risk for each dimension and the weighting of each of the dimensions which includes the user data score; and
sending a notification to a user recommending the vendor software update or not based on the risk score.

12. The computer program product of claim 11, wherein the factors include a software version's end of life and an end of support dates.

13. The computer program product of claim 11, further comprising:
generating a risk management model based on the assessed software update risks including the weighting of each of the dimensions and the risk score; and
sending the notification to the user recommending the vendor software update or not recommending the vendor software update based on the risk management model including the risk score.

14. The computer program product of claim 11, further comprising:
re-weighting the dimensions based on the user data score, after a first weighting for each of the dimensions for each of one or more factors for the selected software program, wherein the first weighting is based on the importance for each of the dimensions for a respective user; and
sending a notification to a user recommending the vendor software update or not recommending the vendor software update based on the risk management model after the re-weighting.

\* \* \* \* \*